United States Patent Office 3,328,485
Patented June 27, 1967

3,328,485
FIRE-RESISTANT POLYESTER RESINS PREPARED FROM 2-METHYL-3,3,3-TRICHLORO-1,2-EPOXYPROPANE
Aurel Blaga, Syracuse, and Michael John Skrypa, Camillus, N.Y., assignors to Allied Chemical Corporation, New York, N.Y., a corporation of New York
No Drawing. Filed Oct. 23, 1965, Ser. No. 504,193
19 Claims. (Cl. 260—869)

This invention relates to unsaturated polyesters and more particularly refers to new and improved fire-resistant, polyester-based thermosetting resins.

Fire-resistant thermosetting resins, such as the halogen containing polyester resins, have found widespread use throughout industry. For instance, such resins are employed in the preparation of castings, moldings, or laminated structures bonded by polyester resins. Typical illustrations of applications of polyester resins are found in castings for live electrical contacts and in the building trades where the polyesters are used to prepare structural members, wall coverings, panels and pipes. The resins employed in the foregoing applications must be hard, infusible, insoluble polyester resins which are flame-retardant, heat-resistant, and possess good optical properties.

The fire-resistant, halogenated, unsaturated polyester-based thermosetting resins which have been previously disclosed contain at least part of their chlorine bound to the portion of the molecule derived from the acidic reactant. Typical chlorinated acided reactants disclosed in the prior art are tetrachlorophthalic anhydride, tetrachlorophthalic acid, Het Acid, Het Anhydride, etc. These acidic monomers have high melting points and are of relatively low reactivity because of the steric effect exerted by the ring-substituted chlorine. The use of such acidic monomers in polyesterifications requires drastic conditions, e.g. long reaction time at relatively high concentrations of relatively more reactive type of catalyst. Such drastic conditions result in products that are partly degraded, highly colored and have poor mechanical properties. Moreover, dicarboxylic acids containing chlorinated aromatic nuclei may not be used for the preparation of polyesters for high temperature applications, since they are more easily decarboxylated than their analogues containing no chlorine. Additionally, although chlorinated polyesters prepared from the above acids contain double bonds, these bonds do not have sufficient reactivity to readily enter into addition reactions with cross-linking monomers such as styrene. Thus, in order to form thermosetting resins it is necessary to incorporate active unsaturation. Such unsaturation is usually provided by incorporating maleic anhydride or fumaric acid into the polyester.

The known halogenated thermosetting resins derived from an entirely aliphatic, chlorinated monomer such as those derived from 3-chloro-1,2-epoxypropane and a mixture of maleic and phthalic anhydrides, result in polyesters, which are not fire-resistant, have poor mechanical properties, and contain hydrolytically unstable chlorine.

It is an object of the present invention ot provide new halogenated, unsaturated polyester resins derived from 2-methyl-3,3,3-trichloro-1,2-epoxypropane. Another object is to provide fire-resistant, self-extinguishing polyester-based thermosetting resin compositions derived from 2-methyl-3,3,3-trichloro-1,2-epoxypropane.

We have now found that new halogenated unsaturated polyester resins which readily enter into addition reactions with vinyl unsaturated monomers to form thermosetting, fire-resistant, heat resistant resin compositions possessing good mechanical and optical properties are prepared by esterifying 2 - methyl - 3,3,3-trichloro-1,2-epoxypropane with a great variety of acidic comonomers.

Among the advantages obtained from halogenated, unsaturated polyester-based thermosetting resins derived from 2-methyl-3,3,3-trichloro-1,2-epoxypropane is their built-in fire resistance. This avoids the use of fireproofing additives which have adverse effects on the mechanical and optical (light transmission) properties of the cured products. Furthermore, such additives tend to exude, a phenomenon which further impairs the usefulness of the plastic. Additionally, since the thermosetting resins of the present invention contain large proportions of chemically stable chlorine, which functions as a flame retardant, they have an economical advantage over those thermosetting resins to which fire-proofing agents must be added inasmuch as desirable fire-resistant materials are provided at little or no extra cost.

The 2-methyl-3,3,3-trichloro-1,2-epoxypropane from which the new polyesters of the present invention are derived is a known compound which may be produced by the condensation of diazomethane with 1,1,1-trichloro-2-propanone or, more economically and less hazardously, by the dehydrochlorination of 2-methyl-1,1,1,3-tetrachloro-2-propanol.

The reaction for the preparation of 2 - methyl - 3,3,3-trichloro-1,2-epoxypropane by this latter method may be represented by the following chemical equation:

$$CCl_3-\underset{\underset{CH_3}{|}}{\overset{\overset{OH}{|}}{C}}-CH_2Cl + NaOH \xrightarrow{H_2O} CCl_3-\underset{\underset{CH_3}{|}}{C}\overset{O}{\overset{\diagup\diagdown}{\rule{0pt}{0pt}}}CH_2 + NaCl + H_2O$$

2-Methyl-1,1,1,3-tetrachloro-2-propanol  　　　2-Methyl-3,3,3-trichloro-1,2-epoxypropane The monomer employed in the preparation of the new polyesters of the present invention was prepared by the following procedure:

EXAMPLE I

*Preparation of 2-methyl-3,3,3-trichloro-1,2-epoxypropane*

Three hundred ml. of a 20 percent aqueous solution of sodium hydroxide (73.2 gms.; 1.83 moles) was placed into a round-bottomed flask equipped with a thermometer and a mechanical stirrer. To the stirred solution was added, dropwise, 2-methyl-1,1,1,3-tetrachloro-2-propanol (352.0 gms.; 1.66 moles). The addition was carried out at 25 to 30° C. over a period of 1 hour. After stirring for an additional ½ hour, the white precipitate was filtered, slurried twice with 300 ml. of cold, and several times with warm water (55–60° C.) to remove traces of by-product sodium chloride. The cake was dried to give 258.0 gms. (88.7% yield) of 2-methyl-3,3,3-trichloro-1,2-epoxypropane, M.P. 48 to 49° C.

The 2-methyl-3,3,3-trichloro-1,2-epoxypropane obtained by a method such as that described in Example I can be used to prepare halogenated thermosetting polyester resins characterized by improved fire resistance and self-extinguishing properties, as well as good chemical stability and good mechanical and optical properties. The polyesters are prepared by the esterification of 2-methyl- 3,3,3-trichloro-1,2-epoxypropane with a great variety of acidic co-monomers (alpha,beta-unsaturated dicarboxylic acids, or their anhydrides) or with any mixtures thereof. Examples of suitable unsaturated acidic co-monomers are: maleic acid and anhydride, fumaric acid, dichloromaleic acid and anhydride, dichlorofumaric acid, itaconic acid and anhydride, citraconic acid and anhydride, aconitic acid and anhydride; also, part of these unsaturated acidic monomers may be replaced by saturated acidic monomers or mixtures thereof such as aliphatic, cycloaliphatic and aromatic acids and their anhydrides. Some specific examples of such saturated acidic monomers are: succinic acid, glutaric acid, adipic acid, pimalic acid, azelaic acid, sebacic acid, phthalic acid, tetrabromophthalic acid and the anhydrides of these acids. Additional examples of acidic monomers which may be employed are: endomethylene-tetrahydrophthalic acid, hexachloro-endomethylene-tetrahydrophthalic acid and their anhydrides. The proportions of saturated and unsaturated acidic components employed is not critical and will be governed by the amount of unsaturation desired in the polyester.

It is also within the contemplation of the present invention to employ mixtures of 2-methyl-3,3,3-trichloro-1,2-epoxypropane with other halogenated or non-halogenated epoxides and diols in the polyesterification reaction with the above-noted acids and anhydrides. Illustrative of such halogenated and non-halogenated epoxides are: 3,3,3-trichloro-1,2-epoxypropane; 3-chloro-1,2-epoxypropane; 1,2-epoxypropane; butyl glycidyl ether and the like. Examples of halogenated and non-halogenated diols suitable for use in conjunction with 2-methyl-3,3,3-trichloro-1,2-epoxypropane are: 3,4-dibromo-3-chloro-1,2-butanediol; 2,2,3,3-tetrachloro-1,4-butanediol; 2,3-dibromo-1,4-butanediol; 5-chloro-1,2-pentanediol; 2 or 4, 5,5,5-tetrachloro-1,3-pentanediol; 2-chloro-1,5-pentanediol; ethylene glycol; propylene glycol; dipropylene glycol; 1,4-butanediol; 1,3-butanediol; 1,2-butanediol; 1,4-pentanediol; 1,5-pentanediol; 1,6-hexanediol and the like.

In the preparation of the new halogenated polyesters of the present invention, the polycarboxylic acids and the 2-methyl-3,3,3-trichloro-1,2-epoxypropane are used in proportions varying over wide ranges, depending upon the properties desired in the final product. Generally the polycarboxylic acids and 2-methyl-3,3,3-trichloro-1,2-epoxypropane are used in substantially equal proportions, about mol for mol, with preferably an excess of 2-methyl-3,3,3-trichloro-1,2-epoxypropane approximating about 20 percent above the stoichiometric quantity required for complete esterification being employed. The esterification is normally carried out at elevated temperatures and atmospheric pressure, although pressures slightly above or below atmospheric may be employed if desired. The temperature at which the esterification is carried out is not critical, and the optimum temperature is usually just below the boiling point of the most volatile component of the reaction mixture. However, temperatures above the boiling point of the lowest boiling component of the reaction mixture may be employed provided the reaction vessel is supplied with a steam heated condenser, which will permit the condensation of the volatilized components and will return them to the reaction mixture.

Additionally, if desired, a small amount of a catalyst and initiator may be employed to hasten the polyesterification reaction. Although the effectiveness of the catalytic agent employed is established for each particular case since it will vary for different materials, the usual polyesterification catalysts, such as lithium hydroxide potassium hydroxide, sodium hydroxide, alkaline earth metal hydroxides, alkoxides, aliphatic amines, aromatic amines, carbanions and the like, may be employed desirably in amounts of from 0.001 to 0.50 percent based on the weight of the total charge. In the case where 2-methyl-3,3,3-trichloro-1,2-epoxypropane is the sole reactant to be esterified with the polycarboxylic acids or anhydrides it is preferred to employ a diol initiator such as ethylene glycol, propylene glycol, diethylene glycol and 1,4-butanediol in proportions of from 0.01 to 5.0 percent based on the weight of the total charge.

The following examples are given to illustrate the preparation of the new halogenated unsaturated polyester resins based on 2-methyl-3,3,3-trichloro-1,2-epoxypropane.

EXAMPLE II

*Polyesterification of 2-methyl-3,3,3-trichloro-1,2-epoxypropane with maleic anhydride*

2-methyl-3,3,3-trichloro-1,2-epoxypropane (233.0 gms.; 1.33 moles), maleic anhydride (107.9 gms.; 1.10 moles), ethylene glycol (11.2 gms.; 0.18 mole), and t-butylhydroquinone free radical polymerization inhibitor (0.10 gm.) were placed in a 500 ml., round-bottomed flask equipped with a thermometer, reflux condenser, mechanical stirrer and inlet for nitrogen. The mixture was heated gradually with stirring until it became homogenous (about 85° C.) under a stream of dry, oxygen-free nitrogen. Sodium hydroxide (0.41 gm.) dissolved in water (1 ml.) was then added, and the temperature brought to 135° C. Stirring was continued at this temperature until the acid number of the reaction product was 12.9 mgs. KOH/gm. The reaction product was a dark brown solid mass. The resulting polyester has the following recurring unit:

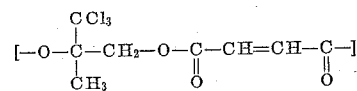

EXAMPLE III

*Polyesterification of 2-methyl-3,3,3-trichloro-1,2-epoxypropane with a 1:1 molar mixture of maleic and phthalic anhydride*

The polyesterification was carried out in the manner outlined in Example II, substituting a 1:1 molar mixture of maleic and phthalic anhydrides for the maleic anhydride of Example II. The product was a dark brown-colored mass having an acid number of 18.9 mgs. KOH/gm. The resulting polyester may consist of hybrid molecular chains having the following recurring units arranged in a regular or random pattern:

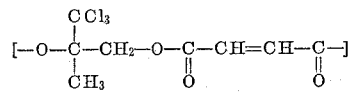

and

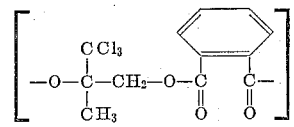

There may also be chains that contain only one type of recurring unit. Theoretically, each of the above polyester molecules contains one fragment

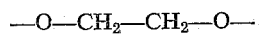

when a glycol such as ethylene glycol is employed as an esterification initiator.

The halogen-containing unsaturated polyesters based on 2-methyl-3,3,3-trichloro-1,2-epoxypropane, such as prepared in the foregoing examples, are readily copolymerizable with vinyl compounds, i.e. polymerizable, ethylenically unsaturated monomers, whereby fire-resistant, polyester-based thermosetting resins are obtained which are useful in reinforced plastic applications, e.g. potting and other industrial purposes, press molding and hand lay-up in conjunction with glass-fiber reinforcement.

The temperature at which the copolymerization between the new chlorine containing polyesters and the vinyl compounds is effected depends upon a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc. The copolymerization is preferably carried out at temperatures ranging from room temperature (about 20° C.) to 150° C. in the presence of a catalyst, such as methyl ethyl ketone peroxide, which is the preferred catalyst, and benzoyl peroxide, di-t-butyl peroxide, lauroyl peroxide, cyclohexanone peroxide, and azo compounds, such as azobis-isobutyronitrile. The catalysts are employed in amounts of from 0.01 to 10 percent, preferably from 0.1 to 1.0 percent, based on the total composition. Additionally, a small amount of a promoter may be incorporated with the catalysts to hasten gelation and cure of the thermosetting resin. Suitable promoters are the metallic salt driers, such as cobalt naphthenate, which are employed usually in amounts of less than 1.0 percent, preferably in amounts ranging from 0.15 to 0.5 percent, based on the weight of the total composition.

The ethylenically unsaturated monomeric cross-linking agents, which are copolymerized with the new chlorine containing unsaturated polyester, are polymerizable materials containing a $CH_2=C<$ group such as styrene, which is the preferred cross-linking agent, vinyl acetate, divinylbenzene, vinyltoluene, alpha halostyrenes, acrylic esters, methacrylic esters, triallylcyanurate, triallyl citrate, tetraallylsilane and the like. The ratio of halogen-containing unsaturated polyester to monomeric cross-linking agent can be varied over a wide range. The halogen-containing polyester content may range from about 10 to 90 percent of the polymerizable mixture. Preferably the polymerizable mixture contains 30 to 40 percent cross-linking agent and correspondingly from 60 to 70 percent halogenated unsaturated polyester resin.

The following examples illustrate the cross-linking of the new halogenated, unsaturated polyester resins of the present invention.

EXAMPLE IV

To 64.0 gms. of the unsaturated polyester, prepared from 2 - methyl - 3,3,3 - trichloro-1,2-epoxypropane and maleic anhydride as described in Example II above, was added 36.0 gms. of styrene containing 0.03 gm. of dissolved t-butylhydroquinone (the concentration of t-butylhydroquinone in the final mixture was about 0.05% by weight). The styrene solution was cast into sheets (5 inches long x ½ inch wide x ⅛ inch thick) by heating at 60° C. for 25 hours with methyl ethyl ketone peroxide (1.0% by weight) as a catalyst in conjunction with cobalt naphthenate (0.15%) as a promoter. The cast resin was a tough, infusible, and insoluble material. The material was rated as self-extinguishing.

EXAMPLE V

Following the procedure outlined in Example IV above, an unsaturated polyester prepared from 2-methyl-3,3,3-trichloro-1,2-epoxypropane and 1:1 molar mixture of maleic and phthalic anhydrides was cast into sheets (5 inches long x ½ inch wide x ⅛ inch thick) and cured. The thermoset resin was a tough, infusible, and insoluble material. The material was rated as self-extinguishing.

We claim:

1. A halogenated, unsaturated polyester comprising the esterification reaction product of (1) a compound selected from the group consisting of (A) alpha,beta-unsaturated dicarboxylic acids, anhydrides and mixtures thereof (B) mixtures of said alpha,beta-unsaturated dicarboxylic acids, anhydrides and mixtures thereof with saturated aliphatic, cycloaliphatic and aromatic dicarboxylic acids, anhydrides and mixtures thereof and (2) a compound selected from the group consisting of 2-methyl-3,3,3-trichloro-1,2-epoxypropane and mixtures thereof with epoxides and diols.

2. A halogenated, unsaturated polyester comprising the esterification reaction product of (1) an alpha,beta-unsaturated dicarboxylic anhydride and (2) 2-methyl-3,3,3-trichloro-1,2-epoxypropane.

3. The halogenated, unsaturated polyester of claim 2 wherein said alpha,beta-unsaturated dicarboxylic anhydride is maleic anhydride.

4. A halogenated, unsaturated polyester comprising the esterification reaction product of (1) a mixture of an alpha,beta-unsaturated dicarboxylic acid anhydride and a saturated aromatic dicarboxylic acid anhydride and (2) 2-methyl-3,3,3-trichloro-1,2-epoxypropane.

5. The halogenated, unsaturated polyester of claim 4 wherein said mixture of anhydrides is a mixture of maleic anhydride and phthalic anhydride.

6. A process for preparing halogenated, unsaturated polyesters which comprises heating a mixture comprising (1) a compound selected from the group consisting of (A) alpha,beta-unsaturated dicarboxylic acids, anhydrides and mixtures thereof (B) mixtures of said alpha,beta-unsaturated dicarboxylic acids, anhydrides and mixtures thereof with saturated aliphatic, cycloaliphatic and aromatic dicarboxylic acids, anhydrides and mixtures thereof with (2) a compound selected from the group consisting of 2-methyl-3,3,3-trichloro-1,2-epoxypropane and mixtures thereof with epoxides and diols in the presence of an esterification catalyst.

7. A process for preparing a halogenated, unsaturated polyester which comprises heating a mixture comprising (1) an alpha,beta-unsaturated dicarboxylic acid anhydride and (2) 2-methyl-3,3,3-trichloro-1,2-epoxypropane in the presence of an esterification catalyst.

8. The process of claim 7 wherein said alpha,beta-unsaturated dicarboxylic acid anhydride is maleic anhydride.

9. A process for preparing a halogenated, unsaturated polyester which comprises heating a mixture comprising (1) a mixture of an alpha,beta-unsaturated dicarboxylic anhydride and a saturated aromatic dicarboxylic anhydride and (2) 2-methyl-3,3,3-trichloro-1,2-epoxypropane in the presence of an esterification catalyst.

10. The process of claim 9 wherein said mixture of anhydrides is a mixture of maleic anhydride and phthalic anhydride.

11. A hard, infusible, insoluble, fire-resistant, self-extinguishing, thermosetting resin produced by copolymerizing (1) the esterification reaction product of a compound selected from the group consisting of (A) alpha,beta-unsaturated dicarboxylic acids, anhydrides and mixtures thereof (B) mixtures of said alpha,beta-unsaturated dicarboxylic acids, anhydrides and mixtures thereof with saturated alphatic, cycloaliphatic and aromatic dicarboxylic acids, anhydrides and mixtures thereof with (C) a compound selected from the group consisting of 2-methyl-3,3,3-trichloro-1,2-epoxypropane and mixtures thereof with epoxides and diols and (2) an ethylenically unsaturated monomeric cross-linking agent.

12. A hard, infusible, insoluble, fire-resistant, self-extinguishing, thermosetting resin produced by copolymerizing (1) the esterification reaction product of (A) an alpha,beta-unsaturated dicarboxylic anhydride and (B) 2-methyl-3,3,3-trichloro-1,2-epoxypropane with (2) an ethylenically unsaturated monomeric cross-linking agent.

13. The thermosetting resin of claim 12 wherein said alpha,beta-unsaturated dicarboxylic anhydride is maleic anhydride and the ethylenically unsaturated monomeric cross-linking agent is styrene.

14. A hard, infusible, insoluble, fire-resistant, self-extinguishing, thermosetting resin produced by copolymerizing (1) the esterification reaction product of (A) a mixture of an alpha,beta-unsaturated dicarboxylic anhydride and a saturated aromatic dicarboxylic anhydride and (B) 2-methyl-3,3,3-trichloro-1,2-epoxypropane with (2) an ethylenically unsaturated monomeric cross-linking agent.

15. The thermosetting resin of claim 14 wherein said mixture of anhydrides is a mixture of maleic anhydride and phthalic anhydride and said ethylenically unsaturated monomeric cross-linking agent is styrene.

16. A process for preparing halogenated, fire-resistant, self-extinguishing, thermosetting resin compositions which comprises heating in the presence of a polymerization catalyst a mixture comprising (1) the esterification reaction product of a compound selected from the group consisting of (A) alpha,beta-unsaturated dicarboxylic acids, anhydrides and mixtures thereof and mixtures of said alpha,beta-unsaturated dicarboxylic acids, anhydrides and mixtures thereof with saturated aliphatic, cycloaliphatic and aromatic dicarboxylic acids, anhydrides and mixtures thereof with (B) 2-methyl-3,3,3-trichloro-1,2-epoxypropane and mixtures thereof with epoxides and diols and (2) an ethylenically unsaturated monomeric cross-linking agent.

17. A process for preparing halogenated, fire-resistant, self-extinguishing, thermosetting resin compositions which comprises heating in the presence of a polymerization catalyst a mixture comprising (1) the esterification reaction product of (A) an alpha,beta-unsaturated anhydride with (B) 2-methyl-3,3,3-trichloro-1,2-epoxypropane and (2) an ethylenically unsaturated monomeric cross-linking agent.

18. The process of claim 17 wherein said alpha,beta-unsaturated dicarboxylic anhydride is maleic anhydride.

19. The process of claim 17 wherein said monomeric cross-linking agent is styrene.

References Cited

UNITED STATES PATENTS

| | | | |
|---|---|---|---|
| 3,251,903 | 5/1966 | Davis | 260—869 |
| 3,254,057 | 5/1966 | Davis | 260—78.4 |
| 3,274,293 | 9/1966 | Elfers et al. | 260—869 |

OTHER REFERENCES

Pacquin, A., "Epoxyverbindunger and Epoxydharze," Springer Verlag, Berlin, 1958 (p. 241) TP986E6, p. 3 C. 2.

MURRAY TILLMAN, *Primary Examiner.*

J. T. GOOLKASIAN, *Assistant Examiner.*